(12) United States Patent
Magnus et al.

(10) Patent No.: US 11,103,819 B2
(45) Date of Patent: *Aug. 31, 2021

(54) METHOD AND APPARATUS FOR REMOVAL OF SAND FROM GAS

(71) Applicant: SegreTECH Inc., Innisfail (CA)

(72) Inventors: Andrew K. Magnus, Calgary (CA); Robert Goodwin, Calgary (CA); J. Jay Halpenny, Calgary (CA); Don Bowes, Calgary (CA); Duncan McIntosh, Calgary (CA); Michael J. Busby, Calgary (CA)

(73) Assignee: SegreTECH Inc., Innisfail (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,973

(22) Filed: Nov. 19, 2019

(65) Prior Publication Data

US 2020/0155986 A1 May 21, 2020

Related U.S. Application Data

(63) Continuation of application No. 15/149,007, filed on May 6, 2016, now Pat. No. 10,512,863.

(Continued)

(51) Int. Cl.
*B01D 45/00* (2006.01)
*B01D 45/02* (2006.01)
(Continued)

(52) U.S. Cl.
CPC ............. *B01D 45/02* (2013.01); *B01D 45/04* (2013.01); *B01D 45/08* (2013.01); *A47L 9/106* (2013.01); *A47L 9/1625* (2013.01); *A47L 9/1641* (2013.01); *A47L 9/1683* (2013.01); *B01D 17/0217* (2013.01); *B01D 19/0042* (2013.01);
(Continued)

(58) Field of Classification Search
CPC .... A47L 9/1683; A47L 9/1641; A47L 9/1625; A47L 9/106; B01D 45/02; B01D 45/08; B01D 45/04; B01D 2221/04; B01D 17/0217; B01D 19/0042; E21B 43/34; C04B 18/023

See application file for complete search history.

(56) References Cited

U.S. PATENT DOCUMENTS 2,754,970 A    7/1956   Ross
2,777,533 A *   1/1957   Segrest .................. C10G 31/00
                                                          96/189

(Continued)

FOREIGN PATENT DOCUMENTS

CA     2712197 A1   7/2009
CA     2706359 A1   12/2010

(Continued)

*Primary Examiner* — Dung H Bui
(74) *Attorney, Agent, or Firm* — Oyen Wiggs Green & Mutala LLP

(57) ABSTRACT

This invention relates to the separation of particulate contaminants from a fluid. In one embodiment of the invention, two sand separators placed in series may be used to separate sand from liquid or gaseous natural gas. This invention has some of its applications in the oil gas industry, particularly for use in separating sand from gas produced by natural gas wells that have been opened by hydraulic fracturing.

18 Claims, 10 Drawing Sheets

Related U.S. Application Data

(60) Provisional application No. 62/186,129, filed on Jun. 29, 2015.

(51) Int. Cl.
    *B01D 45/04*           (2006.01)
    *B01D 45/08*           (2006.01)
    *E21B 43/34*            (2006.01)
    *B01D 17/02*            (2006.01)
    *B01D 19/00*            (2006.01)
    *C04B 18/02*            (2006.01)
    *A47L 9/16*             (2006.01)
    *A47L 9/10*             (2006.01)

(52) U.S. Cl.
    CPC ........ *B01D 2221/04* (2013.01); *C04B 18/023* (2013.01); *E21B 43/34* (2013.01)

(56) References Cited

U.S. PATENT DOCUMENTS

| | | | |
|---|---|---|---|
| 2,861,647 A * | 11/1958 | Musslewhite | B01D 45/02 96/168 |
| 2,893,510 A | 7/1959 | Spann | |
| 3,205,639 A * | 9/1965 | Johnson | B01D 53/0454 95/22 |
| 3,492,795 A | 2/1970 | Guerrieri | |
| 3,560,053 A * | 2/1971 | Ortloff | E21B 43/267 406/14 |
| 3,568,847 A | 3/1971 | Carr | |
| RE27,308 E | 3/1972 | Leonard | |
| 3,822,533 A | 7/1974 | Oranje | |
| 3,873,283 A | 3/1975 | Hamblin | |
| 4,157,903 A | 6/1979 | Kanda et al. | |
| 4,187,088 A | 2/1980 | Hodgson | |
| 4,221,577 A | 9/1980 | Lowrie | |
| 4,519,848 A | 5/1985 | Underwood | |
| 4,626,360 A | 12/1986 | Senyard, Sr. et al. | |
| 4,737,271 A | 4/1988 | Childs | |
| 4,737,282 A | 4/1988 | Senyard, Sr. et al. | |
| 4,885,012 A * | 12/1989 | Thompson | B65G 53/60 55/290 |
| 4,908,049 A | 3/1990 | Yoshida et al. | |
| 4,948,393 A | 8/1990 | Hodson et al. | |
| 5,009,680 A * | 4/1991 | Brekke | F17D 1/005 95/247 |
| 5,296,104 A | 3/1994 | Signorini et al. | |
| 5,344,255 A | 9/1994 | Toor | |
| 5,570,744 A | 11/1996 | Weingarten et al. | |
| 5,819,955 A | 10/1998 | Clarke | |
| 5,882,386 A | 3/1999 | McAferty et al. | |
| 5,958,108 A | 9/1999 | Minihan | |
| 6,019,825 A | 2/2000 | Greene et al. | |
| 6,171,465 B1 | 1/2001 | Compton | |
| 7,044,999 B2 | 5/2006 | Bankstahl et al. | |
| 7,048,865 B1 | 5/2006 | McGee et al. | |
| 7,147,788 B2 | 12/2006 | Tveiten | |
| 7,150,773 B1 | 12/2006 | Duke | |
| 7,309,368 B2 * | 12/2007 | Oh | A47L 9/1625 55/343 |
| 7,537,627 B2 | 5/2009 | Scherrer | |
| 7,785,400 B1 | 8/2010 | Worley et al. | |
| 8,424,784 B1 | 4/2013 | Munisteri | |
| 8,464,971 B1 | 6/2013 | Munisteri | |
| 8,622,135 B2 | 1/2014 | Smartt et al. | |
| 8,627,848 B2 | 1/2014 | Bambara | |
| 9,174,223 B2 | 11/2015 | Dreher et al. | |
| 9,789,429 B2 | 10/2017 | Schook | |
| 2002/0160920 A1 * | 10/2002 | Dawson | C09K 8/685 507/200 |
| 2003/0070813 A1 * | 4/2003 | Irwin, Jr. | E21B 43/122 166/372 |
| 2003/0168391 A1 | 9/2003 | Tveiten | |
| 2004/0004028 A1 | 1/2004 | Stell et al. | |
| 2004/0238227 A1 * | 12/2004 | Smith | E21B 10/573 175/431 |
| 2006/0070735 A1 | 4/2006 | Guerra et al. | |
| 2007/0044437 A1 | 3/2007 | Larnholm et al. | |
| 2007/0180988 A1 | 8/2007 | Bronold | |
| 2007/0215524 A1 | 9/2007 | Stell et al. | |
| 2008/0168753 A1 | 7/2008 | Christiansen et al. | |
| 2008/0202770 A1 * | 8/2008 | Bolding | E21B 33/068 166/386 |
| 2009/0095153 A1 | 4/2009 | Roper et al. | |
| 2009/0173232 A1 * | 7/2009 | Folkvang | B04C 5/04 96/183 |
| 2009/0294375 A1 * | 12/2009 | Lange | B03D 1/1412 210/703 |
| 2010/0180768 A1 | 7/2010 | Folkvang | |
| 2010/0200237 A1 * | 8/2010 | Colgate | E21B 36/003 166/302 |
| 2011/0072970 A1 | 3/2011 | Slobodzian et al. | |
| 2011/0072975 A1 * | 3/2011 | Aarebrot | B01D 19/0057 96/157 |
| 2012/0000643 A1 | 1/2012 | Bruun et al. | |
| 2012/0012309 A1 | 1/2012 | Noles, Jr. | |
| 2012/0035085 A1 * | 2/2012 | Parnell | C09K 8/68 507/213 |
| 2012/0090848 A1 * | 4/2012 | Reddy | C09K 8/08 166/308.2 |
| 2012/0132079 A1 | 5/2012 | Naess et al. | |
| 2012/0241148 A1 * | 9/2012 | Alsop | C09K 8/582 166/246 |
| 2012/0285896 A1 * | 11/2012 | Black | B01D 17/047 210/741 |
| 2012/0325751 A1 | 12/2012 | Renick et al. | |
| 2013/0048284 A1 * | 2/2013 | Santra | C09K 8/594 166/292 |
| 2013/0134109 A1 | 5/2013 | Tweit et al. | |
| 2014/0048138 A1 * | 2/2014 | Kenmore | C02F 11/008 137/1 |
| 2014/0053917 A1 | 2/2014 | Dobbs et al. | |
| 2014/0130676 A1 | 5/2014 | Daniels et al. | |
| 2014/0155305 A1 * | 6/2014 | Hartshorne | C09K 8/90 507/211 |
| 2014/0262230 A1 * | 9/2014 | Harris | E21B 43/124 166/249 |
| 2014/0346118 A1 | 11/2014 | Folkvang | |
| 2015/0290560 A1 * | 10/2015 | Hoydal | B01D 19/0042 95/22 |
| 2015/0343365 A1 | 12/2015 | Borkowski | |
| 2015/0347647 A1 * | 12/2015 | Osborne | B09C 1/002 703/6 |
| 2015/0371386 A1 * | 12/2015 | Zeng | G01N 21/314 382/171 |
| 2016/0038867 A1 * | 2/2016 | Kim | B01D 53/86 55/428 |
| 2016/0216187 A1 * | 7/2016 | Gao | G01N 11/00 |
| 2017/0081346 A1 * | 3/2017 | Yaghi | B01J 31/123 |

FOREIGN PATENT DOCUMENTS

| | | | |
|---|---|---|---|
| CA | 2751644 A1 | 2/2013 | |
| CA | 2788484 A1 | 2/2013 | |
| WO | 2011054296 A1 | 5/2011 | |
| WO | 2013043042 A1 | 3/2013 | |
| WO | WO-2013091719 A1 * | 6/2013 | ......... B01D 19/0042 |
| WO | 2015093935 A1 | 6/2015 | |

* cited by examiner

METHOD AND APPARATUS FOR REMOVAL OF SAND FROM GAS

CROSS-REFERENCE TO RELATED APPLICATIONS

This application is a continuation of U.S. application Ser. No. 15/149,007 filed 6 May 2016, which claims the benefit under 35 U.S.C. § 119 of U.S. Application No. 62/186,129 filed 29 Jun. 2015 and entitled METHOD AND APPARATUS FOR REMOVAL OF SAND FROM GAS which is hereby incorporated herein by reference for all purposes.

FIELD

This invention relates to separating particulate matter, for example sand, from fluids, for example natural gas.

BACKGROUND

Some oil and gas formations can be made economically feasible to drill to recover hydrocarbons by hydraulic fracturing ("Fracking"). Fracking involves the injection, at very high pressure, of a fluid (typically mainly water) with a proppant (typically silica sand). Fracking has been a key technological advancement that has allowed increased production of oil and gas from low porosity formations such as shale, coal seam and generally tight zones.

After a well that has been fracked is completed, the well is tested and then put onto production. At this stage, some of the massive quantities of fracking fluid and proppant flow back to the surface along with hydrocarbons and formation water. The highly erosive nature of this initial production creates significant problems in production equipment downstream of the well.

These difficulties may be handled by placing sand separation, or desanding, equipment immediately downstream of the well. The desanding equipment may be kept in place until the sand flow-back reduces to an acceptable level. This can take several months.

There is a need for improved desanding equipment, especially equipment that can be operated unattended for significant periods of time. There is a particular need for such equipment that can be operated in a way that avoids discharge into the environment of hydrocarbons or sand that is potentially contaminated with hydrocarbons at the location of a well.

SUMMARY

This invention has various aspects. Different aspects may be applied together or individually. Without limitation these aspects include:

Methods for separating particulates from fluids;
Apparatus useful for separating particulates from fluids;
Components of apparatus useful for separating particulates from fluids.

One aspect of the invention provides a system for separating particulate contaminants from fluid. The system comprises first and second particulate separators each comprising an inlet port, an internal cavity and first and second outlet ports. The system comprises: a first conduit connected to discharge fluid from the system, the first conduit fluidly connecting the first outlet port of the first particulate separator to a fluid outlet of the system by way of a flow restrictor; a second conduit fluidly connecting the second outlet port of the first particulate separator to the inlet port of the second particulate separator; a third conduit fluidly connecting the first outlet port of the second particulate separator to the first conduit at a location downstream from the flow restrictor; and a fourth conduit fluidly connecting the second outlet port of the second particulate separator to a particulate discharge outlet for discharging collected particulate matter from the system.

Another aspect of the invention provides a method for separating a particulate contaminant from a fluid. The method comprises: receiving a first substance in a first particulate separator, the first substance comprising a fluid and particulates with a first level of the particulates relative to the fluid; in the first particulate separator: separating some of the fluid from the first substance; and directing the separated fluid out of the first particulate separator through a flow restrictor to a fluid outlet of the system; transporting a second substance from the first particulate separator to a second particulate separator, the second substance comprising the fluid and the particulates with a second level of the particulates relative to the fluid, the second level greater than the first level; in the second particulate separator: separating some of the fluid from the second substance; and directing the separated fluid out of the second particulate separator to a location downstream of the flow restrictor and to the fluid outlet of the system; and accumulating the particulates in the second particulate separator.

Another aspect of the invention provides a system for separating particulate contaminants from a fluid. The system comprises two particulate separators connected in series via several channels. Each channel comprises a valve which allows for flow through that channel to be halted. The particulate separators allow for a contaminated fluid to be separated from the contaminant, with the decontaminated outputs being combined and the particulate contaminant removed from the system.

In some embodiments, fluid is transported between the two particulate separators via a pressure differential across the connecting channel.

Another aspect of the invention provides a method for separating particulate contaminant from a fluid. The method comprises inputting a contaminated fluid into a particulate separator, and partially separating the particulate contaminant from the fluid inside. The decontaminated portion may then be output from the system, with the contaminated portion being transported to another particulate separator via a pressure differential between the two separators. The contaminated portion of the fluid is then fully separated from the particulate contaminant. The decontaminated fluid is output from the system, while the particulate contaminant is removed and disposed of.

In some embodiments, when the second particulate separator becomes filled with sand, it may be isolated from the system and emptied by closing the valves connecting it to the first particulate separator and the output. In these embodiments, the first separator is allowed to continue operating, filling with sand until the second separator is emptied and re-introduced into the system.

In further embodiments, the particulate separators are sand separators, the fluid is liquid or gaseous natural gas, and the particulate contaminant is sand. In yet other embodiments, the fluid may be some other liquid or gas, such as water or air, and the particulate contaminant can be some other solid, such as dirt.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
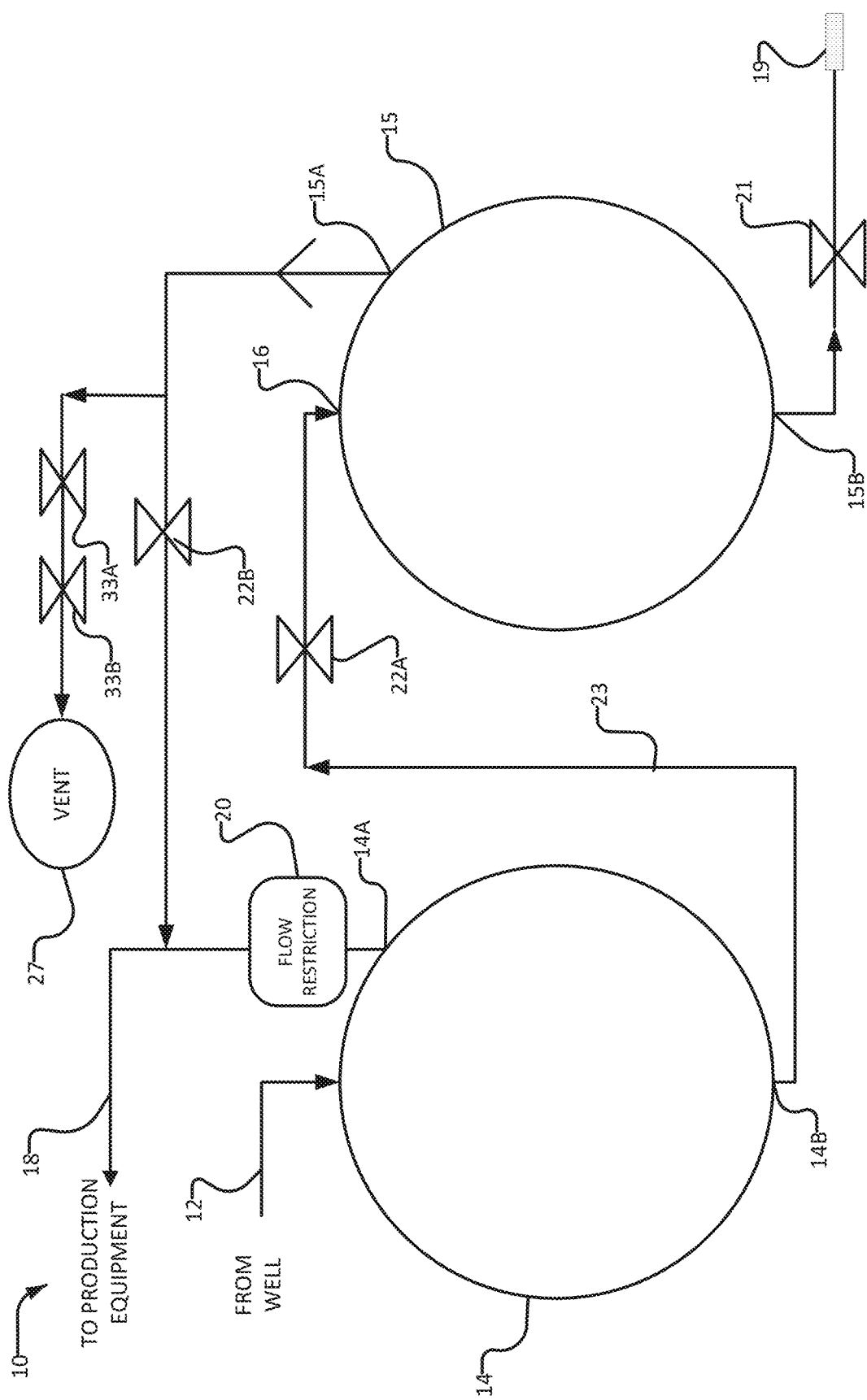
FIG. 1 is a schematic view illustrating main components of desanding apparatus according to an example embodiment.

FIG. 1 illustrates schematically a sand separator 10 according to an example embodiment of the invention. Sand separator 10 has an input 12 which receives a flow of hydrocarbons (e.g. natural gas) being produced by a well. The incoming hydrocarbons are typically at a pressure that is significantly higher than atmospheric pressure. For example, pressures of 1000 p.s.i. (about 7000 kPa) and higher are not uncommon. The incoming hydrocarbons may carry particulate matter, for example sand. It is desirable to separate the sand and/or other particulate matter from the fluids (e.g. hydrocarbons) before further processing and transporting the hydrocarbons.

Separator 10 includes a first separation stage 14 and a second separation stage 15 that are connected in series with one another. Hydrocarbons from inlet 12 flow into first sand separation stage 14. First sand separation stage 14 has first and second outlets, 14A and 14B. Outlet 14B leads to an inlet 16 into second sand separation stage 15. Outlet 14A leads to a fluid outlet 18 of sand separator 10. As discussed above, outlet 14A may provide desired hydrocarbons to fluid outlet 18. In some embodiments, fluid outlet 18 may connect to production equipment, a natural gas pipeline and/or the like (not shown). First separation stage 14 and a second separation stage 15 may have the same or different constructions. First sand separation stage 14 and a second separation stage 15 may comprise vessels of the same or different volumes.

When hydrocarbons carrying sand enter first sand separation stage 14, the sand is removed from the stream of flowing hydrocarbons and tends to fall to the bottom of first sand separation stage 14. Outlet 14B is located in a lower portion of first sand separation stage 14 where sand tends to collect.

The hydrocarbons, now relatively free of sand, leave first sand separation stage 14 though outlet 14A and flow to fluid outlet 18. Most of the material exiting first sand separation stage 14 through outlet 14A is gas in typical applications where the presence of sand results from fracking.

Second sand separation stage 15 has a first outlet 15A and a second outlet 15B.

Referring again to FIG. 1, first outlet 15A is fluidly connected to fluid outlet 18. Second outlet 15B leads to a particulate discharge outlet 19 by way of which collected sand may be removed from apparatus 10. For example, when it is time to remove sand that has accumulated in apparatus 10, a truck (for example a vacuum truck) may connect to particulate discharge outlet 19 and withdraw sand from second sand separation stage 15 as discussed below.

A pressure differential is established between the inlet 16 to second sand separation stage 15 and first outlet 15A of second sand separation stage 15. This pressure differential may be established by providing a restriction 20 in the flow of fluid exiting first sand separation stage 14 by way of exit 14A. Restriction 20 may be provided, for example, by an orifice, a variable valve, a filter, a tortuous passage, and/or the like. In some embodiments, restriction 20 is provided by a variable valve or orifice such that the amount of pressure differential can be adjusted. First outlet 15A of second sand separation stage 15 connects to fluid outlet 18 downstream from restriction 20.

The magnitude of the pressure differential between the inlet 16 to second sand separation stage 15 and first outlet 15A of second sand separation stage 15 may be controlled and/or designed for so that sand separator 10 functions as described herein. Advantageously, this pressure differential may be configured to be just high enough to reliably transport sand and liquids from first sand separation stage 14 to second sand separation stage 15. In some embodiments a pressure differential in the range of about 40 psi (about 300 kPa) to about 100 psi (about 700 kPa) is sufficient. The actual pressure differential required in any particular application will depend on characteristics of the well and of the particular design of the sand separation apparatus being used.

When sand separator 10 is operating to collect sand, incoming gases flow through first sand separation stage 14, as described above. Sand falls to the bottom of first sand separation stage 14 and is urged into outlet 14B by the pressure differential between first sand separation stage 14 and second sand separation stage 15. This establishes a steady stream of sand and fluid, flowing from first sand separation stage 14 into second sand separation stage 15 by way of outlet 14B. In some applications the material exiting first sand separation stage 14 is primarily a mixture of sand and liquids.

In second sand separation stage 15, the sand is collected, while any gas that flows into the second sand separation stage 15 can flow out to fluid outlet 18 by way of outlet 15A. Gas from first sand separation stage 14 also proceeds to fluid outlet 18 by way of exit 14A and flow restrictor 20.

Over time, a significant quantity of sand may accumulate within second sand separation stage 15. When a suitable quantity of sand has accumulated in second sand separation stage 15, such accumulated sand may be removed. This may be done while sand separator 10 continues to operate. For this purpose, sand separator system 10 may be designed in a way that permits second sand separation stage 15 to be isolated from first sand separation stage 14.

The embodiments illustrated in FIG. 1 comprises isolation valves 22A and 22B. Isolation valve 22A closes off the flow in a conduit 23 connecting outlet 14B of first sand separation stage 14 to the inlet 16 to second sand separation stage 15. Isolation valve 22B is downstream from outlet 15A of second sand separation stage 15 and isolates second sand separation stage 15 from fluid outlet 18.

When both of valves 22A, 22B are closed, second sand separation stage 15 is isolated from first sand separation stage 14 and from fluid outlet 18. After second sand separation stage 15 has been isolated, as described above, the pressure within second sand separation stage 15 may be reduced to a lower level, for example by opening depressurization valves 33A, 33B. In the illustrated embodiments, depressurization valves 33A, 33B are connected to outlet 15A of second sand separation stage 15 upstream of isolation valve 22B to allow the pressure within the second sand separation stage 15 to be vented to atmosphere through vent 27.

After isolation of second sand separation stage 15 (via valves 22A, 22B) and optional depressurization of second sand separation stage 15 (via depressurization valves 33A, 33B), sand that has accumulated in second sand separation stage 15 may be removed from separator 10 by way of particulate discharge outlet 19. For example, valve 21 may be opened and a suitable conduit (e.g. a hose) may be connected to particulate discharge outlet 19. Collected materials (e.g. sand) may be sucked through particulate discharge outlet 19 into a truck which can take the sand for disposal. Optionally, the pressure within second separation stage 15 may be kept somewhat higher than atmospheric pressure so that the pressure within second sand separation stage 15 assists in expelling accumulated sand.

While both of valves 22A and 22B are closed, sand may continue to be separated from hydrocarbons in first sand separation stage 14. The separated sand may accumulate in the lower part of first sand separation stage 14.

After the sand has been removed from second sand separation stage 15, particulate outlet valve 21 and depressurization valves 33A and 33B may be closed and isolation valves 22A and 22B may be opened. When the second sand separation stage 15 is again placed into service by closing particulate outlet valve 21 and depressurization valves 33A and 33B, and opening isolation valves 22A and 22B, the collected sand in first sand separation stage 14 is driven by the pressure differential described above through outlet 14B into second sand separation stage 15, thereby transferring any sand that has accumulated in first sand separation stage 14 into second sand separation stage 15 as described above.

Sand separation stages 14 and 15 may have any of a wide variety of constructions. Sand separation stages 14 and 15 may be the same or similar to one another or different. In some embodiments, one or both sand separation stages 14 and 15 is provided by a sand separator having a known construction.

In sand separation stages 14 and 15 particulates may be separated from fluids by gravity, centrifugal forces or combinations of these. The separation may be facilitated by flow patterns established by the internal configuration of sand separation stages 14 and 15. In some embodiments, first sand separation stage 14 is made as described in U.S. Pat. No. 7,785,400 which is hereby incorporated herein by reference for all purposes.

In some embodiments the design of first sand separation stage 14 is such that gas tends to swirl inside first sand separation stage 14. This swirling may be augmented by withdrawal of material from outlet 14A, which may be centrally located at in an upper portion of first sand separation stage 14, and/or outlet 14B which may be centrally located at the bottom of first sand separation stage 14.

In some embodiments, either one or both of sand separation stages 14 and 15 comprises a generally spherical vessel. As is well-known, a spherical pressure vessel can be lighter in weight for the same volume and pressure rating than pressure vessels of other shapes.

Figure 3:
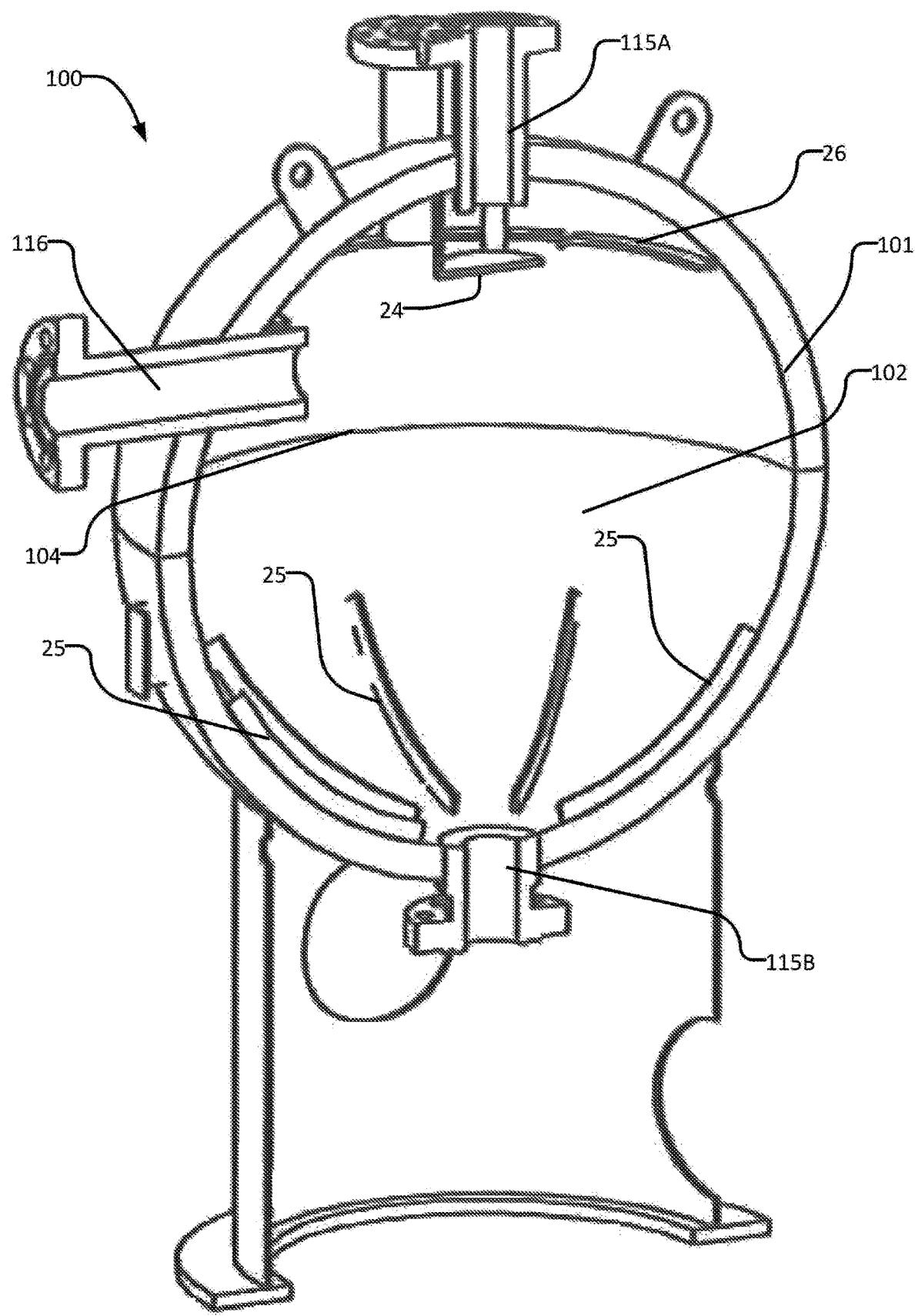
FIG. 3 is a isometric view of the internal features of one sand separation stage, according to an example embodiment.

FIG. 3 shows an example sand separator 100 that may be used as a first or second sand separation stage 14 or 15. Sand separator 100 comprises a pressure vessel 101 that encloses an interior volume 102. Inlet 116 enters volume 102 above a centerline 104 of vessel 101. A first outlet 115A is located at or near the top end of interior volume 102. A second outlet 115B is located at or near the bottom end of interior volume 102. A plate 24 may optionally be provided adjacent to outlet 115A. Plate 24 blocks material from flowing directly into outlet 115A from below.

Sand separator 100 comprises impingement ribs 25. Impingement ribs 25 are arranged (e.g. radiating from second outlet 115B along lower portions of interior circumferences of sand separator 100 with angular spacing) to resist circulation of fluid in the lower portion of second sand separator 100 such that sand that enters sand separator 100 tends to settle to the bottom of sand separator 100.

Sand separator 100 comprises an impingement collar 26. Collar 26 projects inwardly from an interior wall of sand separator 100. Collar 26 facilitates sand settlement by re-directing any particulate that may rise up the vessel wall. In some embodiments, collar 26 is above a mid-line of sand separator 100. In some embodiments collar 26 is above inlet 116 of sand separator 100. Collar 26 may extend in a complete circle.

Sand separator 100 may include an inlet guide passage formed to direct entering fluids along a desired trajectory to aid circulation. The inlet guide may, for example comprise a flange-mounted tube that projects through inlet 116 into volume 102. The end of the inlet guide may be formed to direct the flow of entering fluids in a desired direction. For example, the entering fluids may be directed downwardly and/or may be directed to one side. Injection of fluids through the inlet guide may cause fluids to circulate around volume 102.

Figure 3A:
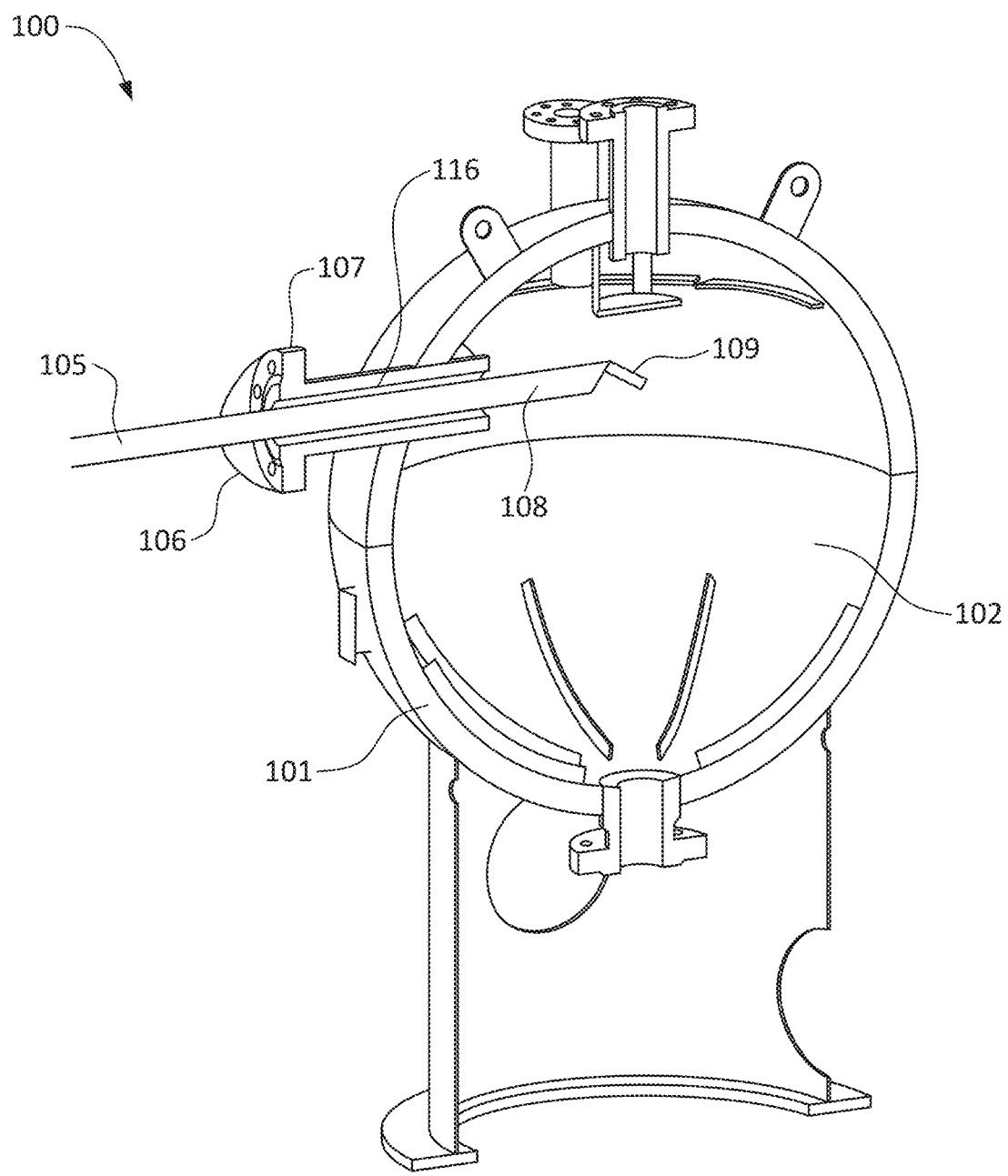
FIG. 3A is a cross-sectional view of a sand separation stage according to another example embodiment.

FIG. 3A shows an example inlet guide 105. Inlet guide 105 includes a flange 106 that mounts to an inlet flange 107 of inlet 116. A conduit 108 carries incoming fluids into volume 102. The tip of conduit 108 may be bent, curved and/or may include a nozzle, deflection surface or other flow-directing member 109.

Sand separation stages according to some embodiments have inlets arranged to create counter-flowing streams that meet one another. Interaction of the counter-flowing streams reduces the velocity of entrained particulates. This can help to remove the particulates from the flow. Counter-flowing streams may be created by providing two inlets or splitting the flow entering one inlet for example.

Figure 3B:
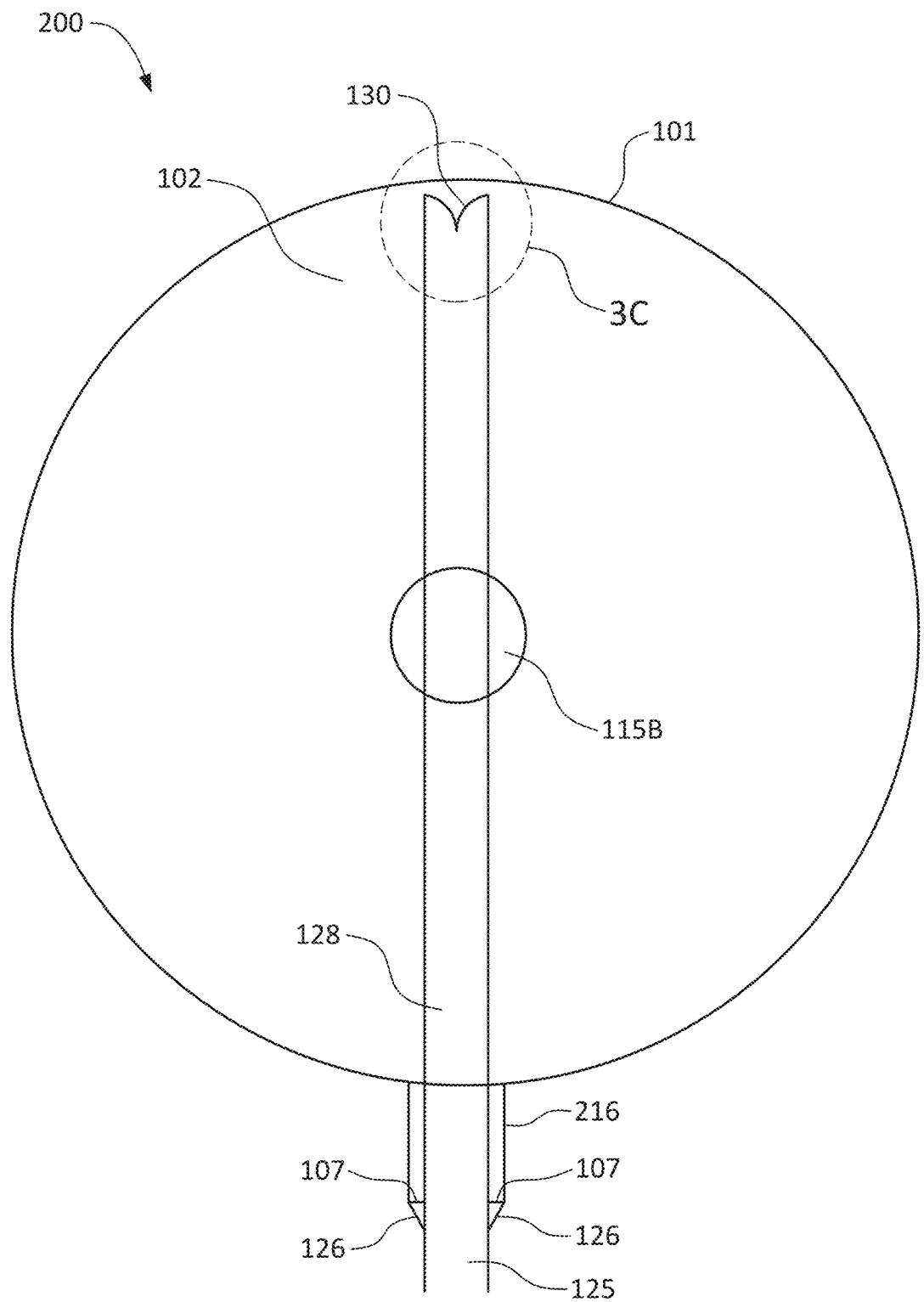
FIG. 3B is a schematic illustration showing a separation stage that includes a flow splitter.

FIG. 3B is a cross-section view showing features of construction of another example sand separator 200 that may be used to provide one or both of first and second sand separation stages 14, 15. Sand separator 200 is similar to sand separator 100 except for the arrangement of an inlet

216. Components of sand separator 200 that are also found in sand separator 100 are labelled with the same references used in FIG. 3.

Inlet 216 includes an inlet guide 125 that includes a flow splitter arranged adjacent to the inner surface of a wall of vessel 101. In the illustrated embodiment, inlet guide 125 includes a flange 126 that mounts to flange 107 of inlet 216. An inlet conduit 128 extends through inlet 216 across volume 102 to a location proximate an opposite wall of vessel 101. A flow splitter 130 is mounted at the end of inlet conduit 128. Flow splitter 130 may be in the upper half of volume 102.

Figure 3C:
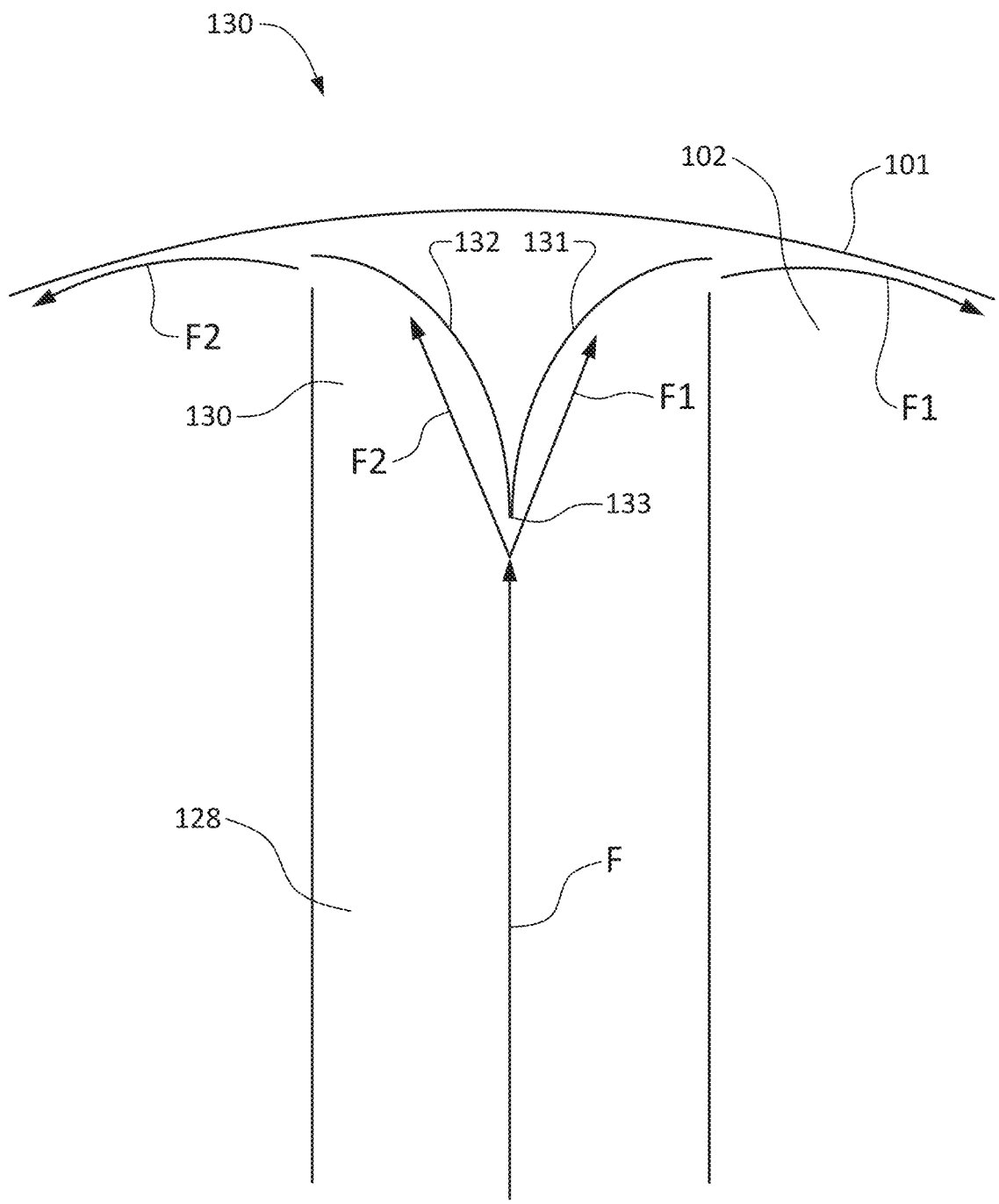
FIG. 3C is an expanded view of a flow splitter of the separation stage of FIG. 3B.

FIG. 3C shows an example flow splitter 130. Flow splitter 130 comprises curved plates 131 and 132 that meet at a knife edge 133. Plates 131 and 132 may be made of a hard abrasion-resistant material. Knife edge 133 may be arranged vertically such that the flow of fluid F entering through inlet conduit 128 is split into two approximately equal parts F1 and F2 upon hitting knife edge 133. Parts F1 and F2 are directed in opposing directions and are released from flow splitter 130 generally tangentially to the inner wall of pressure vessel 101. Flows F1 and F2 flow along the inner wall of pressure vessel 101 in opposing directions and collide with one another at a location opposite to flow splitter 130 slightly below inlet 216.

In some embodiments both of first and second sand separation stages 14, 15 are arranged to generate counter-flowing streams that collide with one another as illustrated, for example, in FIG. 3C. In some embodiments both of first and second sand separation stages 14, 15 comprise sand separators 200 as shown in FIG. 3C.

As indicated herein, sand separators used as sand separation stages 14, 15 may have any of a wide variety of constructions In some embodiments a sand separator used for a sand separation stage includes some combination of:
- inlet nozzles, conduits and/or deflectors;
- baffles, plates;
- mist separators;
- anti-swirl features such as impingement ribs;
- impingement collars.

In some embodiments a sand separator used for the first or second sand separation stage includes a combination of two or more of impingement ribs 25, collar 26 and plate 24.

A sand separator according to any embodiment, particularly when used as a second sand separation stage 15 may optionally comprise a siphon-type outlet. The siphon-type outlet may comprise a tube inside volume 102 having an end spaced-apart above a low point in volume 102 The tube may exit through the wall of pressure vessel 101. When material has collected to a depth such that the top of the collected material is above the opening of the tube a pressure differential between ends of the tube may force collected material up into the tube through which the material can exit pressure vessel 101.

Figure 4:
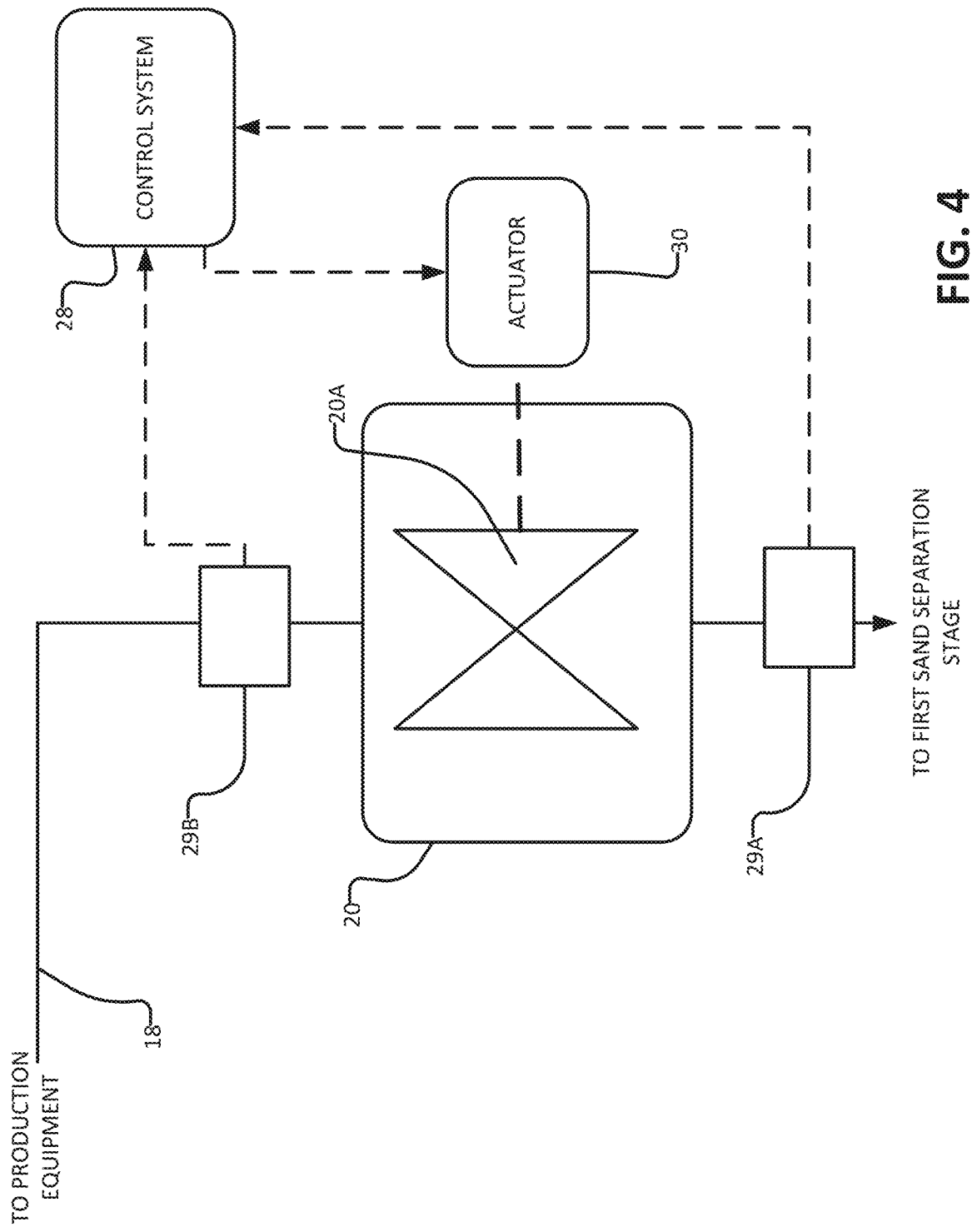
FIG. 4 is a schematic view of an actuator valve and control system, according to an example embodiment.

Various optional enhancements may be provided to the basic system depicted in FIG. 1. For example, as depicted in FIG. 4, flow restrictor 20 may comprise an actuator controlled valve 20A. A control system 28 may operate valve 20A to maintain a desired pressure differential across valve 20A even if there are changes in the flow rate of gas flowing through separator 10. Control system 28 may, for example, have inputs from pressure sensors 29A and 29B on either side of valve 20A and an output connected to control an actuator 30 that is operable to vary the amount of resistance provided by valve 20A to fluid flow. In some embodiments, control system 28 is configured to automatically (and/or under manual control) reduce the restriction provided by flow restrictor 20 when second separation stage 15 is isolated from first separation stage 14.

Figure 2:
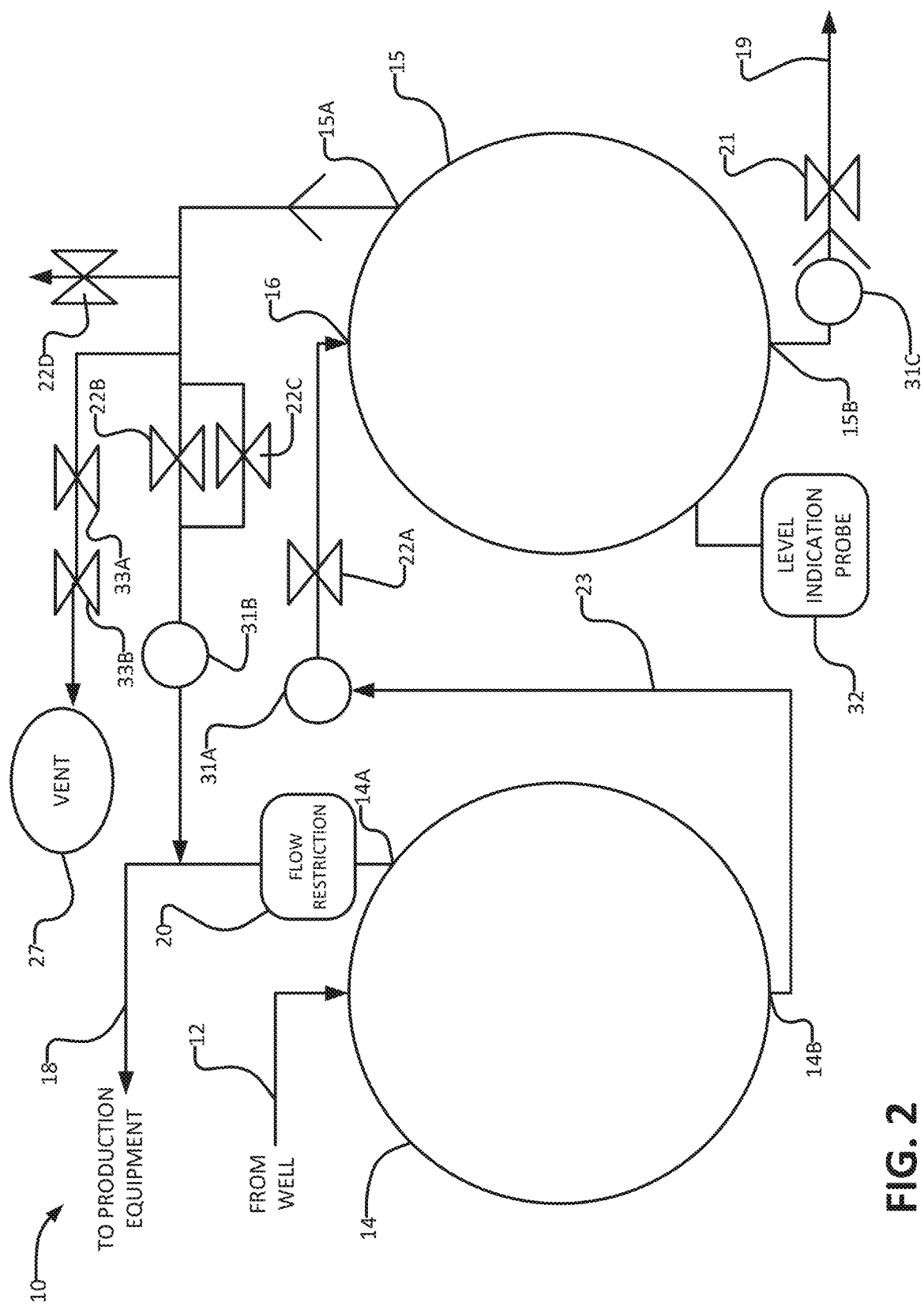
FIG. 2 is a schematic view illustrating more detailed or optional components of the design of FIG. 1, according to an example embodiment.
Figure 7:
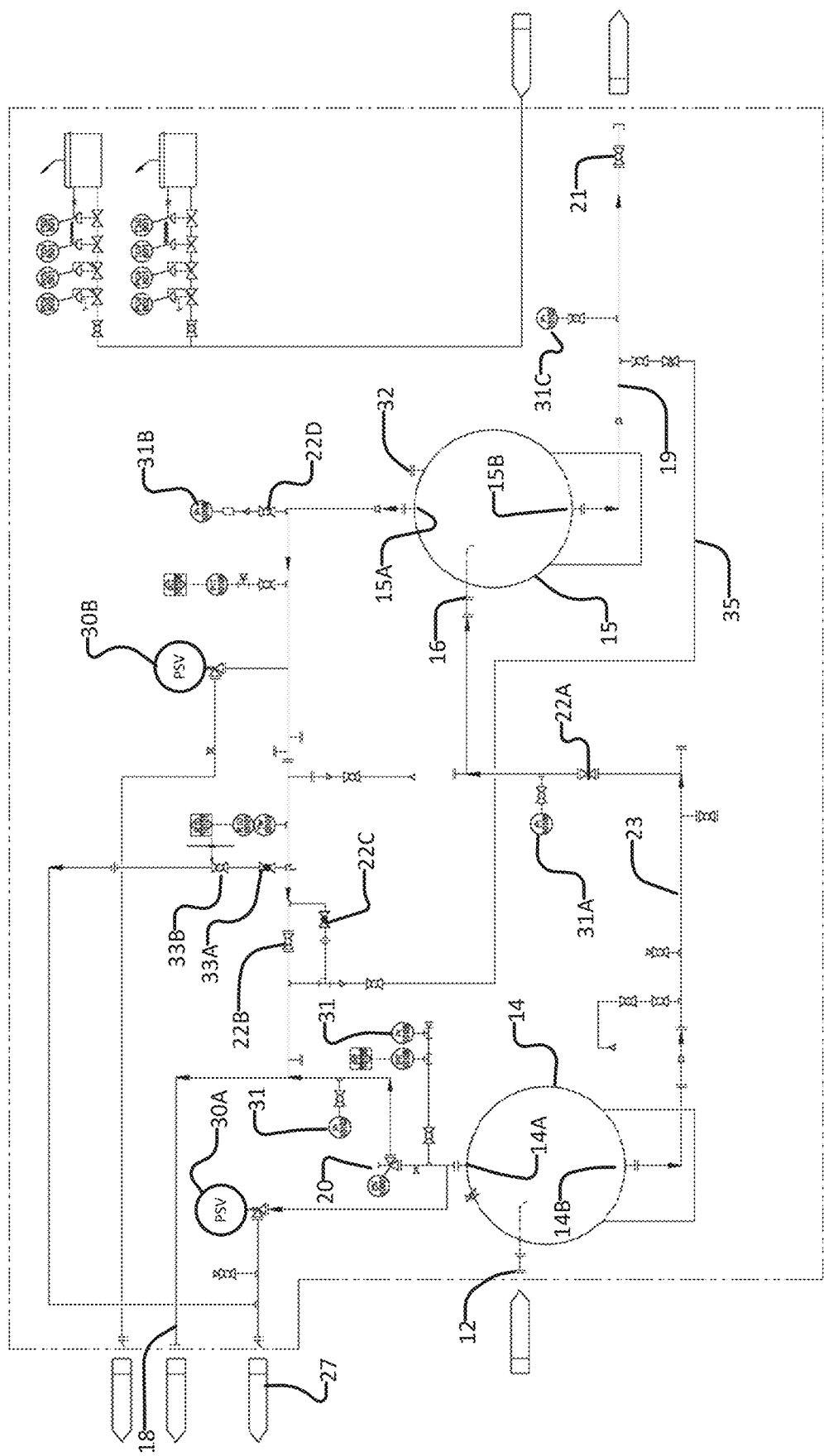
FIG. 7 is a blueprint view illustrating additional detail or additional optional components of the desanding apparatus of FIG. 1, according to an example embodiment.

In the embodiment illustrated in FIG. 7, system 10 comprises pressure safety valves (PSVs) 30A and 30B which may be respectively connected to first outlets 14A, 15A of first and second sand separation stages 14, 15 and which may provide outlets to atmosphere in the case of unsafe conditions (e.g. where the pressure in one or both of sand separation stages 14, 15 exceeds a safety threshold). In the FIG. 7 embodiments PSVs 30A, 30B share the same vent 27 as depressurization valves 33A, 33B, although this is not necessary and one or more of PSVs 30A, 30B or depressurization valves 33A, 33B could have its own vent. FIGS. 2 and 7 also show example embodiments comprising an optional pair of isolation valves (22B and 22C) in place of isolation valve 22B of FIG. 1. Isolation valves 22B, 22C may be operated as described above in connection with isolation valve 22B to facilitate de-pressurizing and re-pressurizing sand separator 10 as described herein. In the embodiment of FIGS. 2 and 7, one of the valves (e.g. valve 22B) may be a relatively larger or robust valve than the other one of the valves (e.g. valve 22C), in which case, the smaller valve 22C may be used as a bypass valve which in certain situations would allow the re-introduction of pressure to vessel 15 and/or equalize pressure on either side of the larger valve 22B. Once the pressure differential on either side of main valve 22B has been reduced, it may be easier to operate main valve 22B independently.

The embodiments illustrated in FIGS. 2 and 7 also include pressure indicators 31 at various locations. These pressure indicators allow operators to understand the pressures and pressure differentials between various parts of sand separator 10. For example, an operator who wishes to remove sand from second sand separation stage 15 may check pressure indicator 31C to ensure that the pressure within second sand separation stage 15 is at a safe level before the operator opens valve 21 to discharge sand through particulate discharge outlet 19.

Figure 5:
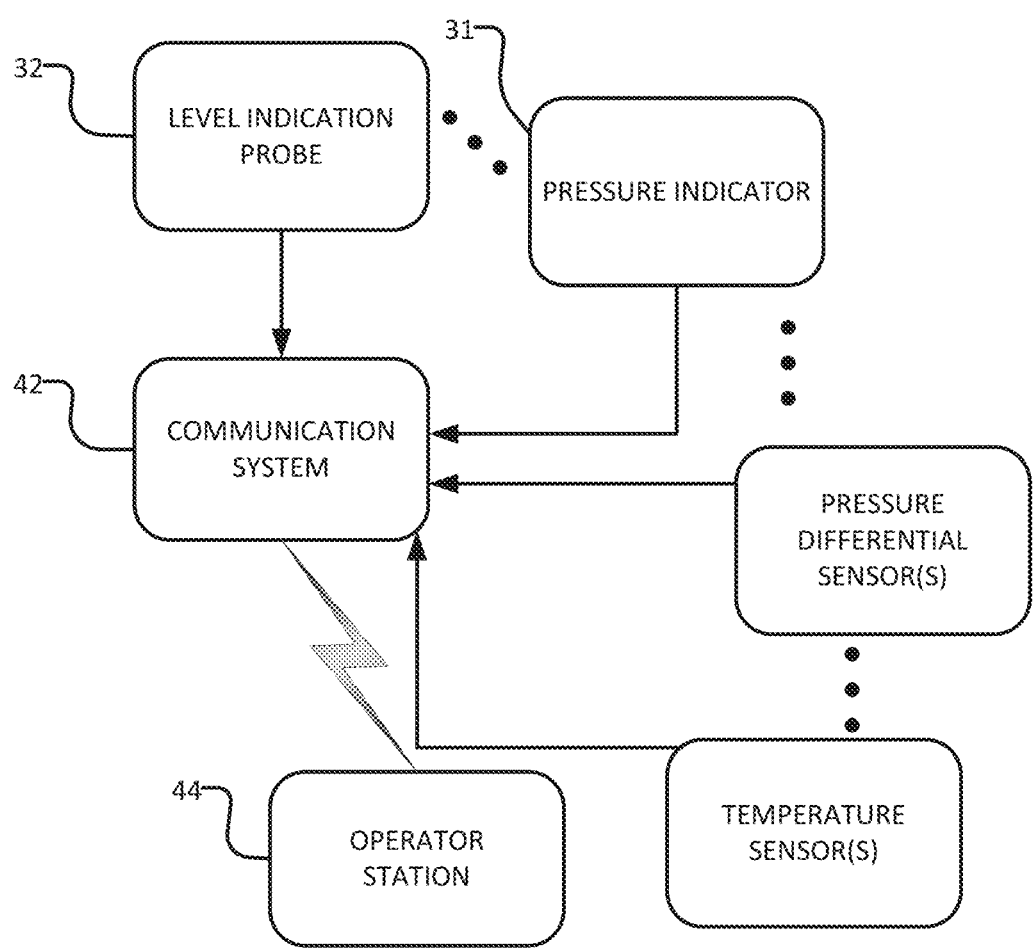
FIG. 5 is a flow diagram of the communication process between a level indication probe and an operator, according to an example embodiment.

As shown in FIGS. 2 and 7, sand separator 10 optionally includes a level indication probe 32 which indicates the level of sand that has accumulated in second sand separation stage 15. Such a level indication probe 32 may be particularly useful when sand separator 10 is at a remote location. As shown in FIG. 5, an output of level indicator probe 32 may be communicated by way of a wireless communication system 42 (such as a cellular network, radio communication system, or the like) to an operator 44 who can arrange for sand to be removed from second sand separation stage 15. Similarly, communication system 42 may be used to communicate the output from other sensors, such as pressure indicators 31, temperature sensors (not expressly shown), sensors measuring the above-discussed pressure differential and/or the like. In some embodiments, the output of any such sensors may trigger the communication to an operator 44. For example, level indicator probe 32 may trigger a communication to operator 44 when the amount of sand in second sand separation stage 15 has reached a threshold (e.g. a configurable threshold) level. Operator 44 may then arrange for sand removal from system 10.

It can be appreciated that the embodiments described above offer the advantages that it is not necessary to shut down the well or to manually remove sand from sand separator 10. Further, sand separator 10 may have a relatively large capacity for sand. This is facilitated by separating sand from hydrocarbons in a first sand separation stage 14 while accumulating separated sand in a second vessel (e.g. in second sand separation stage 15).

In some embodiments second sand separation stage 15 has a capacity at ⅔ full of over 1,000 kg of sand. Providing a large sand capacity significantly reduces the degree of operator attendance, and can accommodate large "slugs" of saturated sand which might overwhelm some existing lower-capacity sand separators.

In an example application the fluid pressure at a well head is 2,000 psi (about 14000 kPa). A flow rate into sand separator 10 may be 160 decs (4.544 mmscf/day). The flow may include 160 barrel of oil equivalent (BOE) of natural gas liquids. Sand most typically only travels up the well bore attached to liquid. For flow rates in this range, it is beneficial for the conduit 23 that carries sand from outlet 14B of first sand separation stage 14 to the inlet 16 of second sand separation stage 15 to have a cross sectional area of approximately 3.1 square inches (approximately 20 cm$^2$) (corresponding to a pipe diameter of 2 inches (about 5 cm)). With this pipe size the velocity of material flowing into second separation stage 15 is typically low enough that conduit 23 is not subjected to excessive erosion. In some embodiments, conduit 23 comprises a larger-diameter pipe or tube having a central section that is of a reduced diameter. For example, conduit 23 may comprise a 3 inch pipe swaged down to have a central portion 2 inches in diameter. A drain may be provided at a low point of conduit 23 to allow conduit 23 to be emptied when apparatus 10 is to be stored.

Any embodiment may optionally provide a way to introduce pressurized fluid into a drain line 19. The pressurized fluid may fluidize particulates in drain line 19 to facilitate removing collected particulates from a sand separator. Pressurized fluid may come from any of a wide variety of sources. It can be convenient to use gas from an output of system 10 as a pressurized fluid to assist in removal of particulates.

FIG. 7 shows a bubble line 35 that extends from outlet line 18, which serves as a source of pressurized fluid, to outlet line 19. A valve 26 allows a flow of gas to be delivered into outlet line 19 by way of bubble line 35. Bubble line 35 may deliver gas into a sparger located within outlet line 19. The sparger may, for example, comprise a conduit extending for a distance along outlet line 19 and having a wall penetrated with small perforations through which pressurized fluid can escape into outlet line 19.

Figure 6:
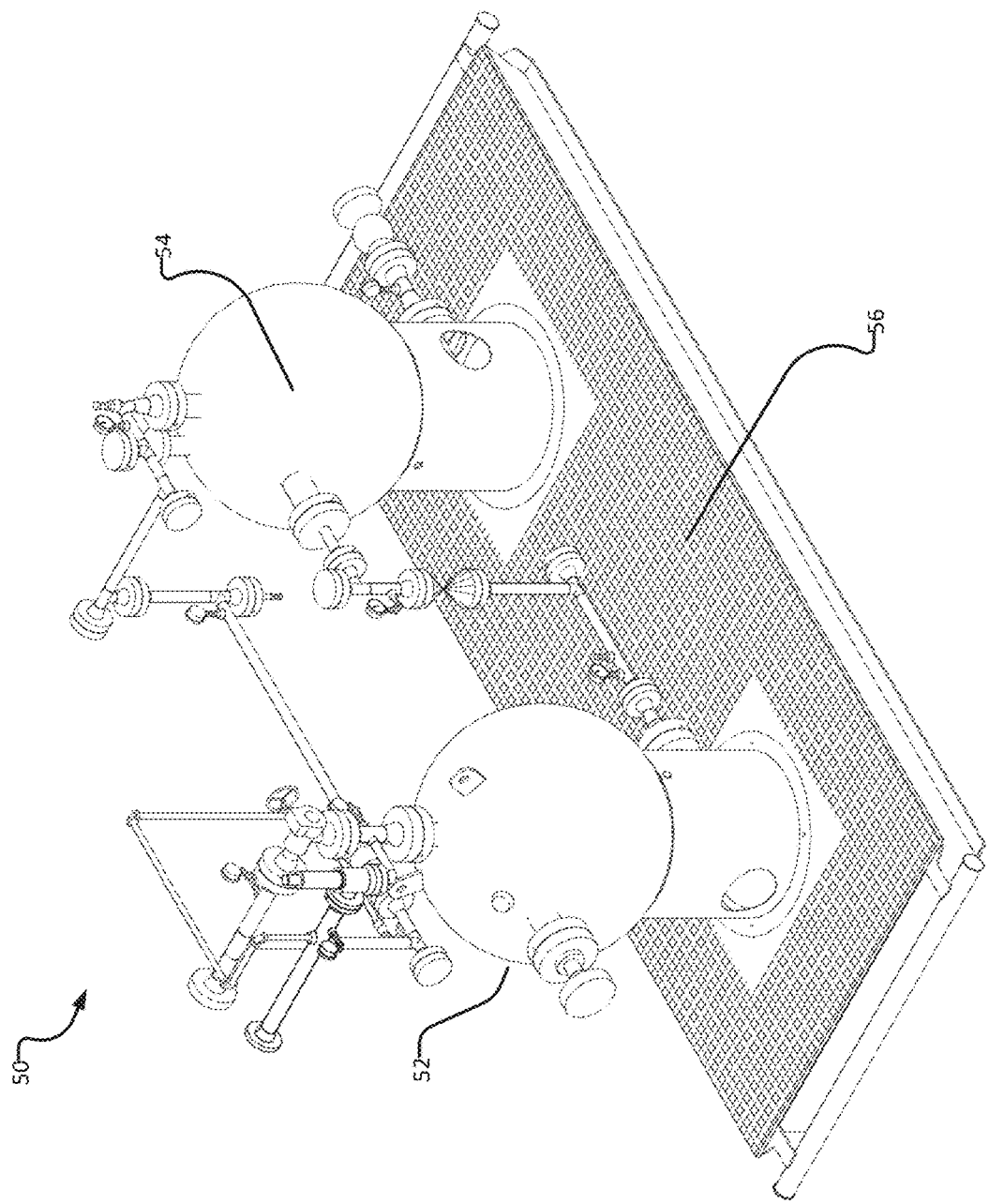
FIG. 6 is an isometric view of two sand separation stages attached to a portable skid, according to an example embodiment.

Conveniently, apparatus as described herein may be provided on a single skid. For example, FIG. 6 shows a skid-mounted apparatus 50 comprising first and second sand separators 52 and 54 mounted on a portable skid 56. Skid 56 may be of a size that is readily transportable.

In example embodiments, the following steps may be taken in order to start sand separator 10, to isolate second sand separation stage 15 from first sand separation stage 14, and to re-pressurize the system after sand has been evacuated from second sand separation stage 15. For reference, the relevant valves of these example embodiments are shown in the table below. The table also provides example sizing for the valves.

TABLE 1

Valves and Procedures

| Valve | Valve I Type | Operating Position | Shut-In for Clean-Out | Re-Pressure After Clean-Out | Purge |
|---|---|---|---|---|---|
| 22B | 2" Ball | N.O. | 1 - Close | 5 - Open | 2 - Open |
| 22A | 2" Gate | N.O. | 2 - Close | 6 - Open | 4 - Open |
| 33B | 1" Ball | N.C. | 3 - Open | 3 - Close | |
| 33A | 1" Globe | N.C. | 4 - Open | 2 - Close | |
| 21 | 3" Ball | N.C. | 5 - Open | 1 - Close | |
| 22D* | 1" Ball | N.C. | See Note | See Note | See Note |
| 22C | 1" Globe | N.C. | | 4 - Open | 1 - Open<br>3 - Close |

*Valve 22D Note:
Optional valve 22D is shown in FIG. 7. Following step 3 of the Shut-In procedure (described below), optional valve 22D can be opened and used for adding liquid or additional air to assist with the clean out (sand removal) process, if desired. Valve 22D should be closed before beginning the purging or re-pressure procedure.

Initial Start-Up:
1. Power Up the Electronics
   a. Attach ground wire
   b. Hoist the Solar mast, orient the panel South East and fix in position
   c. Open SCADA panel and close all breakers/fuses
   d. Open battery box and check "Sun Saver" indicators
   Note: Boot up may take 10 minutes, system is on-line when digital display operational
   f. Compare pressure readout on display to pressure indicators 31 to ensure numbers match
   g. Close battery box and SCADA panel
2. Ensure the valves to all pressure indicators "P.I." 31 are open and tied
3. Ensure all Valves 21, 22, and 33 are closed
4. Ensure outlet 14A is closed
5. Ensure flow restrictor 20 is open (showing 100%)
6. Introduce minimal gas pressure from the well
7. Leak test all connections from V-100 to outlet 14A, to Valves 22A, 22B and 22C
8. Open Valve 22A
9. Leak test all connections from V-101 to Valves: 22A to 21 to 22D to 33A to 33B to 22B and 22C
10. Purge System by opening valve 33B and then slowly opening valve 33A until stream exits the exhaust pipe 27, close valve 33B and then close valve 33A, burp valve 33B
11. Incrementally increase well pressure while monitoring for leaks
12. Confirm pressure readout on digital screen to pressure indicators 31 and ensure software is online and functioning properly.
13. Once operating conditions achieved adjust flow restrictor 20 to desired setting and confirm ΔP (pressure differential across flow restrictor 20)
14. Check all pressure indicators 31 to ensure proper operation (e.g. an inlet pressure that is in general agreement with the well head pressure, an outlet pressure that is less than the inlet pressure by an amount corresponding to flow restrictor 20 and a differential pressure that corresponds to the difference between the desired input and output pressures). Truck-Out pressure indicator 31C to be locked open.

Shut-In for Clean-Out:
1. Confirm read-out on Containment Gauge
2. Open valves to all pressure indicators 31
3. Follow steps 1 through 4 in the "Shut-In for Clean-Out" column of Table 1 above and then confirm no pressure on pressure indicators 31 prior to step 5 identified in the "Shut-In for Clean-Out" column of Table 1 above Purge Process after Clean-Out
1. Ensure valves 21, 22A, 22B, 22C, 22D, and 30A are closed 2. Open valve 30B
3. Partially open valve 22A allowing some amount (e.g. 100 PSI) of pressure into vessel 15
4. Partially open valve 30A and allow a small gas stream to be vented for approximately 20 seconds
5. Close valve 30A then close valve 30B
6. Open valve 22A completely
7. Open valve 22B Completely Re-Pressure after Clean-Out:
If valve 22D was opened during Clean-Out close first.
1. Perform steps 1 through 3 in the "Re-Pressure After Clean-Out" column of Table 1 above
2. Perform step 4 in the "Re-Pressure After Clean-Out" column of Table 1 above which involves opening valve 22C to slowly re-introduce operating pressure
3. Perform step 5 in the "Re-Pressure After Clean-Out" column of Table 1 above which involves opening valve 22B which will open more easily once the pressure is re-established by valve 22C
4. Perform step 6 in the "Re-Pressure After Clean-Out" column of Table 1 above which involves opening valve 22A, whereupon the unit is back in operation
5. Check all pressure indicators 31 to ensure proper operation.

In some applications only a relatively small amount of sand is expected to be produced. This may occur, for example, where a well is to be subjected to a short test or where a well is producing sand at a low rate. In such applications a simplified apparatus comprising only a single sand separator may be used. Such a simplified apparatus may, for example comprise a sand separator as shown in FIG. 3C. In such cases, particulates such as sand may be allowed to accumulate within volume 102. The sand separator may be taken off-line to remove the sand from the sand separator.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
"high pressure" means pressures of at least 1000 psi (at least about 7000 kPa)
the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

While processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g. a sand separator, valve, orifice, particulate, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for separating contaminants including one or more of sand and liquids from natural gas, the method comprising:
receiving a pressurized flow of natural gas and entrained contaminants from a gas well into a first particulate separator of a system comprising the first particulate separator and a second particulate separator wherein the first particulate separator comprises a first pressure vessel enclosing a first internal cavity and the second particulate separator comprises a second pressure vessel enclosing a second internal cavity and the flow has a first level of entrained contaminants relative to gas;

maintaining a pressure differential between the first and second internal cavities such that a pressure within the first internal cavity is greater than a pressure within the second internal cavity;

in the first particulate separator: separating some of the gas from the flow, the separating comprising reducing a velocity of the flow, allowing the contaminants to settle toward a lower portion of the first internal cavity and directing the separated gas out of the first internal cavity to an outlet;

transporting a remainder of the flow, including the settled contaminants, from the first particulate separator to the second particulate separator wherein, in the remainder of the flow, a level of contaminants relative to gas is higher than the first level, wherein the transporting is driven by the pressure differential between the first and second internal cavities of the first and second particulate separators respectively;

in the second particulate separator: allowing gas from the remainder of the flow to flow out of the second internal cavity and allowing the contaminants to accumulate in a lower portion of the second internal cavity; and suppressing circulation of fluid within a lower part of the second internal cavity, wherein suppressing the circulation of fluid comprises allowing the fluid to interact with impingement ribs that project from a wall of the second pressure vessel into a lower portion of the second internal cavity, the impingement ribs radiating in angularly spaced apart directions.

2. The method according to claim 1 wherein maintaining the pressure differential comprises restricting a flow of the separated gas at a location between the first internal cavity and the outlet and directing the gas of the remainder of the flow from the second internal cavity to the outlet.

3. The method according to claim 2 wherein restricting the flow of the separated gas comprises passing the flow of the separated gas through a variable flow restrictor and controlling the variable flow restrictor to maintain a desired pressure differential between the first and second particulate separators.

4. The method according to claim 1 comprising accumulating the contaminants in the internal cavity of the second particulate separator until the internal cavity of the second particulate separator is more than half full of the contaminants.

5. The method according to claim 1 comprising monitoring a level of the contaminants in the second internal cavity and triggering a communication when the level of contaminants in the second internal cavity reaches a threshold level.

6. The method according to claim 1 comprising:
isolating the second particulate separator from the first particulate separator and from the fluid outlet;
while the second particulate separator is isolated, removing the accumulated contaminants from the second particulate separator; and
while the second particulate separator is isolated continuing to receive the flow of natural gas and entrained contaminants from the gas well into the first particulate separator and allowing the entrained contaminants to accumulate in the first particulate separator.

7. The method according to claim 6 wherein removing the accumulated contaminants from the second particulate separator comprises, while the second particulate separator is isolated from the first particulate separator, providing a pressure within the second particulate separator that is higher than atmospheric pressure and allowing the higher than atmospheric pressure within the second particulate separator to assist in expelling the accumulated contaminants through a drain of the second particulate separator.

8. The method according to claim 7 comprising removing the accumulated contaminants from the second pressure vessel by way of a siphon-type outlet from the second particulate separator.

9. The method according to claim 6 wherein restricting the flow of the separated gas comprises passing the flow of the separated gas through a variable flow restrictor and the method comprises reducing a restriction provided by the variable flow restrictor when the second particulate separator is isolated from the first particulate separator.

10. The method according to claim 6 comprising, after removing the accumulated contaminants from the second particulate separator, repressurizing the second internal cavity of the second particulate separator by opening valves to place the second internal cavity into fluid communication with the first internal cavity of the first pressure vessel and the fluid outlet.

11. The method according to claim 1 comprising driving the remainder of the flow through a conduit that extends from a drain near a bottom of the first internal cavity of the first particulate separator to a port in an upper portion of the second internal cavity of the second particulate separator.

12. The method according to claim 11 comprising fluidizing particulates in the conduit by introducing a pressurized fluid into the conduit at one or more locations between the drain of the first particle separator and the port of the second particle separator.

13. The method according to claim 1 comprising removing the separated gas from the first particulate separator by way of an outlet located at or near a top end of the first internal cavity of the first pressure vessel.

14. The method according to claim 13 comprising removing the remainder of the flow from the first internal cavity of the first pressure vessel by way of an outlet located at or near a bottom of the first internal cavity.

15. The method according to claim 1 comprising maintaining the pressure differential in the range of about 40 psi (about 300 kPa) to about 100 psi (about 700 kPa).

16. The method according to claim 1 wherein the remainder of the flow is primarily a mixture of sand and liquid.

17. The method according to claim 1 wherein transporting the remainder of the flow, including the settled contaminants, from the first particulate separator to the second particulate separator comprises maintaining a steady stream of sand and fluid flowing from the first internal cavity to the second internal cavity.

18. The method according to claim 1 wherein the second internal cavity has a capacity when ⅔ filled of at least 1000 kg of sand.

* * * * *